United States Patent [19]

Lewis et al.

[11] 4,359,735
[45] Nov. 16, 1982

[54] MULTI-SAMPLING-CHANNEL PULSE COMPRESSOR

[75] Inventors: Bernard L. Lewis, Oxon Hill; Frank F. Kretschmer, Jr., Laurel, both of Md.

[73] Assignee: The United States of America as represented by the Secretary of the Navy, Washington, D.C.

[21] Appl. No.: 206,130

[22] Filed: Nov. 6, 1980

[51] Int. Cl.³ ............................................. G01S 13/28
[52] U.S. Cl. ......................... 343/17.2 PC; 343/5 NQ; 367/101
[58] Field of Search ..................... 343/17.2 PC, 5 NQ

[56] References Cited

U.S. PATENT DOCUMENTS

| | | | |
|---|---|---|---|
| 3,680,105 | 7/1972 | Goldstone | 343/17.2 PC |
| 3,987,285 | 10/1976 | Perry | 343/17.2 PC X |
| 4,005,417 | 1/1977 | Collins | 343/17.2 PC X |
| 4,005,423 | 1/1977 | Webb | 343/17.2 PC |
| 4,028,700 | 6/1977 | Carey et al. | 343/17.2 PC |
| 4,167,737 | 9/1979 | Freedman | 343/17.2 PC |
| 4,204,165 | 5/1980 | Ready | 343/17.2 PC X |

Primary Examiner—T. H. Tubbesing
Attorney, Agent, or Firm—Robert F. Beers; William T. Ellis

[57] ABSTRACT

A digital pulse compression processor for reducing the processing loss in target-echo signals caused by sampling time errors comprising a first processing channel for sampling the echo signal in accordance with pulses from a first clock signal and a second processing channel for sampling the echo signal in accordance with pulses from a second clock signal at the same sampling frequency as the first clock signal but with its pulses interlaced, in time, approximately midway between the pulses of the first clock signal to ensure that the largest sampling error will be one-quarter of a sampling period or less. The sampled signals in each channel are then digitized and compressed, and then processed to form the compressed signal envelope. The resultant signal envelopes from each channel are multiplied together to form a low-sidelobe narrow output pulse.

13 Claims, 5 Drawing Figures

MULTI-SAMPLING-CHANNEL PULSE COMPRESSOR

BACKGROUND OF THE INVENTION

This invention relates generally to radar and sonar processing systems, and more particularly, to pulse compression processing systems utilizing sampling techniques.

Pulse compression techniques are frequently utilized in radar and sonar systems in order to transmit long pulses with a large energy content so as to obtain both good detection capability (range) and good range resolution. In the operation of a conventional pulse compression system, the carrier frequency of a transmitter is varied linearly or in a step-wise approximation to linear over a frequency bandwidth B, which defines the basic signal information bandwidth. When a target reflected echo is received, this signal may be processed through a matched filter which compresses the target reflected pulse into a relatively short pulse. This target reflected pulse may be compressed up to 1/B. Such matched filter processing is implemented by correlating each received signal with the signal transmitted such that a short compressed pulse is obtained at the point of optimum correlation. This compressed pulse will be accompanied by spurious responses commonly referred to as range or time sidelobes on either side thereof. High range-time sidelobes not only decrease the sensitivity of the system but also allow big targets with large sidelobes to effectively mask smaller targets, i.e. an aircraft with a large cross-section could effectively mask a missile of much smaller cross-section. Accordingly, a prime concern in the reflected signal processing art is the reduction of such sidelobes.

It is known in the art that digital-type processing yields quite low range-time sidelobes. It has been found that the sampling of the target echo signal at the Nyquist rate for the information baseband yields the lowest sidelobe ratio (generally on the order of 30 dB). The Nyquist rate is defined as twice the information bandwidth B or, where in-phase (I) and quadrature (Q) reference frame signals are used, it is the same as the information bandwidth. The signal samples resulting from the sampling operation are passed through a discrete or digital correlator that compares them with the transmitted waveform and produces an output which is the autocorrelation function of the transmitted waveform. This autocorrelation function will have a maximum value when the sampling begins at the beginning of the incoming target-echo signal. However, when the target-echo leading edge arrives halfway between samples, then the maximum of the autocorrelation function is significantly reduced. The target echo signal energy is essentially spread over two or more sampling periods or range cells resulting in a flattened maximum mainlobe with a lower mainlobe to sidelobe ratio. Thus, such a half sampling period error yields a significant range resolution loss and a decrease in radar sensitivity. As noted above, such spreading of the mainlobe is especially detrimental because it allows large cross-section targets to effectively mask smaller targets.

In order to avoid such sampling error losses, pulse compressor samplers generally operate at much higher rates than the optimum Nyquist rate in order to reduce the possible delay error between the start of a sampling period and the arrival of the leading edge of the target echo signal. However, such high sampling rates increase the range-time sidelobes in radar and sonar systems utilizing linear or step approximation to linear frequency modulation waveforms such that the autocorrelation response approaches a (sin X) X falloff, i.e. the mainlobe to sidelobe ratio approaches 13 dB. The resulting high sidelobes force designers to amplitude weight the frequency spectrum of the received target-echo signal in order to obtain a sidelobe reduction. This spectrum weighting, in essence, removes energy from certain frequencies in the return-echo pulse thereby tapering the frequency spectrum of the pulse with attendant sidelobe reduction. However, such spectrum tapering also reduces the bandwidth of the target echo signal. But, since the transmitter bandwidth remains unchanged, the receiver bandwidth is no longer matched to the signal bandwidth resulting in a reduced signal-to-noise ratio. Accordingly, such weighting reintroduces sensitivity loss and reduces the energy efficiency of the system.

OBJECT OF THE INVENTION

Accordingly, it is an object of the present invention to significantly reduce the sampling error in a pulse compression processor without introducing objectionably high range-time sidelobes which will require weighting.

It is a further object of the present invention to significantly reduce the sampling error in a pulse compression processor such that the optimum sampling rate for obtaining low range time sidelobes may be utilized.

It is a yet further object of the present invention to prevent target masking in pulse compressor systems by large cross-section targets.

It is a still further object of the present invention to significantly narrow the mainlobe compressed pulse resulting from the correlation process in a sampled pulse compression system while maintaining a high mainlobe to sidelobe ratio.

Other objects, advantages, and novel features of the present invention will become apparent from the detailed description of the invention, which follows the summary.

SUMMARY OF THE INVENTION

Briefly, the above and other objects are obtained by providing a pulse compression processor comprising two or more signal processing channels with sampling periods interlaced, in time, such that the largest possible sampling error is significantly reduced. In a two channel system the first processing channel would sample the I and Q baseband echo signals from a transmission in accordance with pulses from a first clock signal at a predetermined frequency while the second processing channel would sample the I and Q baseband signals in accordance with pulses from a second clock signal at the same predetermined frequency as the first clock signal but with its pulses interlaced, in time, approximately midway between the pulses of the first clock signal. The sampled signals in each channel are than compressed and processed to form a compressed signal envelope. The resultant signal envelopes from each channel are multiplied together to form a narrow low-sidelobe output pulse.

When n processing channels are desired for further reduction of the sampling error, then the i th processing channel where $1 \leq i \leq n$ would sample the I and Q baseband signals in accordance with the pulses from an i th clock signal at the same predetermined frequency but with the i th clock pulses interlaced, in time, with the first clock signal pulses such that the i th clock signal is (i) (360°)/(n) out of phase with the first clock pulses. The sampled signals in each of the n channels would be compressed and then processed to form the respective compressed signal envelope, and the resultant n signal envelopes multiplied together to form a narrow low-sidelobe output pulse with low range-time sidelobes.

The above set out multi-channel pulse compression processing system allows the use of an optimum sampling frequency rate while significantly reducing the potential sampling error normally attendant from such optimum sampling frequency usage.

DETAILED DESCRIPTION OF THE PREFERRED EMBODIMENT

Figure 1:
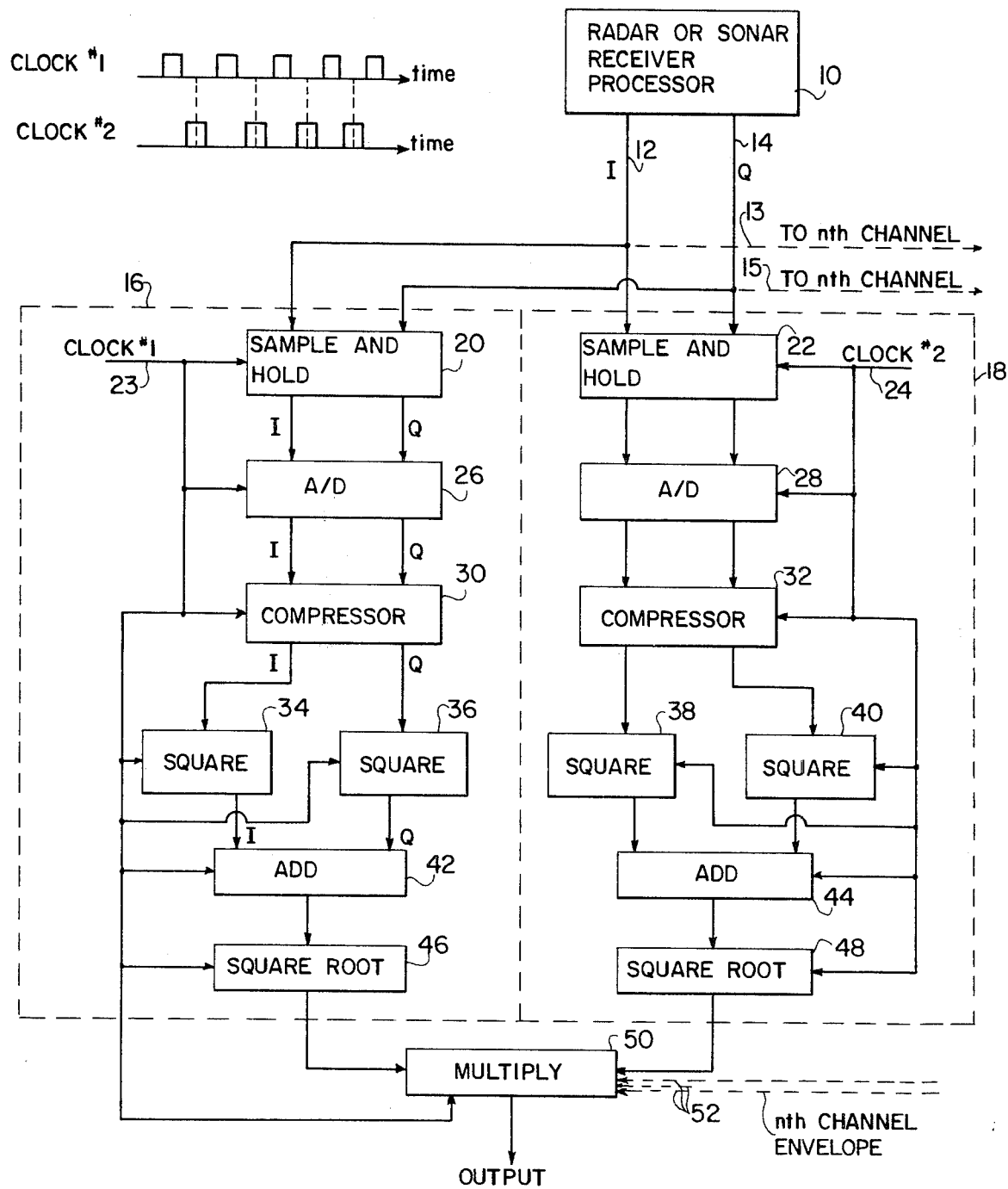
FIG. 1 is a block diagram of the multi-channel pulse compression system of the present invention.

Referring now to the figures, FIG. 1 shows a detailed block diagram of the multi-channel pulse compressing processor of the present invention. For ease of explanation the present invention will be discussed in the context of a two channel pulse compression system. However, there is no intention to limit the present invention in any fashion to such a two channel pulse compression system.

In the figure, a receiver processor 10 may be utilized to receive the target reflections or echoes from transmitted expanded linear or step-approximation to linear frequency-modulation signals. The receiver processor 10 operates to beat or heterodyne these target echoes signals down to an intermediate frequency signal. Additionally, because this intermediate frequency target target echo signal could have any phase at the time of the reception by the receiver, proper processing requires the generation of an in-phase I reference signal and a quadrature phase Q reference signal in order to obtain both amplitude and phase information. Accordingly, the radar processor 10 beats or heterodynes the intermediate frequency target echo signal with a local oscillator intermediate frequency signal to produce the I and Q information baseband signals in the well known manner. These I and Q signals are applied via the lines 12 and 14 to a sample and hold circuit 20 in a first channel 16 and to a sample and hold circuit 22 in a second channel 18. The sample and hold circuit 20 is driven in accordance with pulses from a clock signal No. 1 applied on line 23. Likewise, the sample and hold circuit 22 is driven in accordance with pulses from a clock signal No. 2 applied via line 24. The clock signals 1 and 2 have the same frequencies but the pulses in the clock signal No. 2 are interlaced, in time, approximately midway between the pulses of clock signal 1. Clock signals 1 and 2 are shown in the upper left hand corner of FIG. 1 in order to show this interlacing, in time, of the clock pulses.

Accordingly, the mid-point of the sampling period for the sample and hold circuit 20 corresponds to the beginning of the sample period for the sample and hold circuit 22. This technique of sampling half way between the samples of the first sampler insures that the largest sampling error than can be obtained in a two channel system is one-quarter of a sample period.

Sampled signals from the sample and hold circuit 20 may then be applied either directly to a compressor circuit 30 or via an analog/digital converter 26 if digitized I and Q signals are desired. The compressor 30 operates to perform the autocorrelation of the received target echo signal with the complex conjugate of the transmitted signal in the well known manner. A variety of pulse compressor designs could be utilized in the present invention. By way of example, and not be way of limitation, the digital pulse compressor disclosed in the patent to Cantrell and Lewis entitled "HIGH SPEED DIGITAL PULSE COMPRESSOR" U.S. Pat. No. 4,237,461 or the discrete pulse compressor disclosed in the application to Kretschmer, Jr. and Lewis entitled "LOW SIDELOBE LINEAR FM CHIRP SYSTEM" filed Aug. 22, 1980, Ser. No. 180,548 (without the I and Q addition), may be utilized to implement the present invention.

The autocorrelation I and Q signal outputs from the compressor 30 are then processed to form the envelope of the compression or autocorrelation function. There are a number of techniques which may be utilized to generate the envelope of the autocorrelation function. In the present embodiment this envelope is formed by generating the magnitude of the vector formed by the vector combination of the I and Q signals. This magnitude generation may be obtained by squaring the correlated I and Q values of each output word generated by the compressor 30, summing the squared I and Q output words, and generating a signal representative of the square root of this sum. The foregoing process is implemented by applying the I autocorrelation output word to the squaring circuit 34 while applying the autocorrelation Q output word to the squaring circuit 36. The squaring circuits 34 and 36 may be implemented for convenience by digital 10-bit multipliers. The squared I output word from the squaring circuit 34 and squared Q output word from squaring circuit 36 are applied to an adding circuit 42 where they are summed. The sum of these two squared output words are then applied to a square root circuit 46 which generates a signal proportional to the square root of the incoming signal. By way of example, this square root circuit 46 may be implemented by a standard look-up table, i.e. a random access memory.

The identical process described for channel 16 is also utilized to process the sampled I and Q signals in channel 18. More specifically, the sample I and Q signals are applied to a compressor circuit 32 via an analog/digital converter 28. The autocorrelation I and Q output words generated by the compressor 32 are then applied respectively to the squaring circuits 38 and 40 which operate to square their respective input words. The squared I output word and the squared Q output word from the squaring circuits are then added in the adder 44 and applied to the square root circuit 48 to obtain the autocorrelation envelope.

The resultant envelope signals from the square root circuit 46 and the square root circuit 48 are applied to a multiply circuit 50 which operates to multiply the envelopes together to obtain a narrow mainlobe pulse with low sidelobes.

Figure 2:
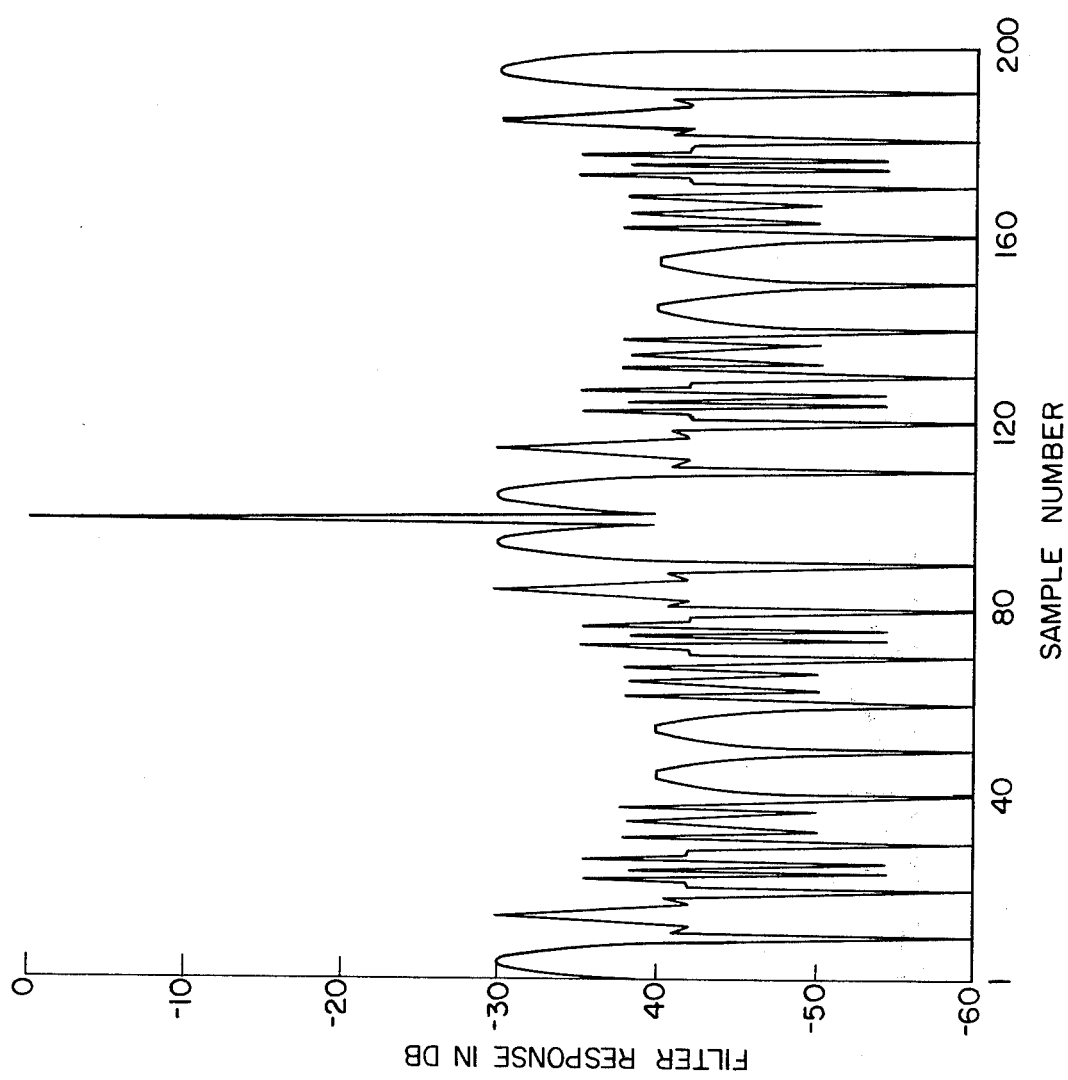
FIG. 2 is a graph of the filter response in dB for no sampling error.

FIG. 2 is a graph providing the filter response in dB for a standard pulse compression system sampling at the Nyquist rate with no sampling error. It should be noted that the mainlobe is extremely narrow and the first sidelobes are approximately 30 dB down from the mainlobe.

Figure 3:
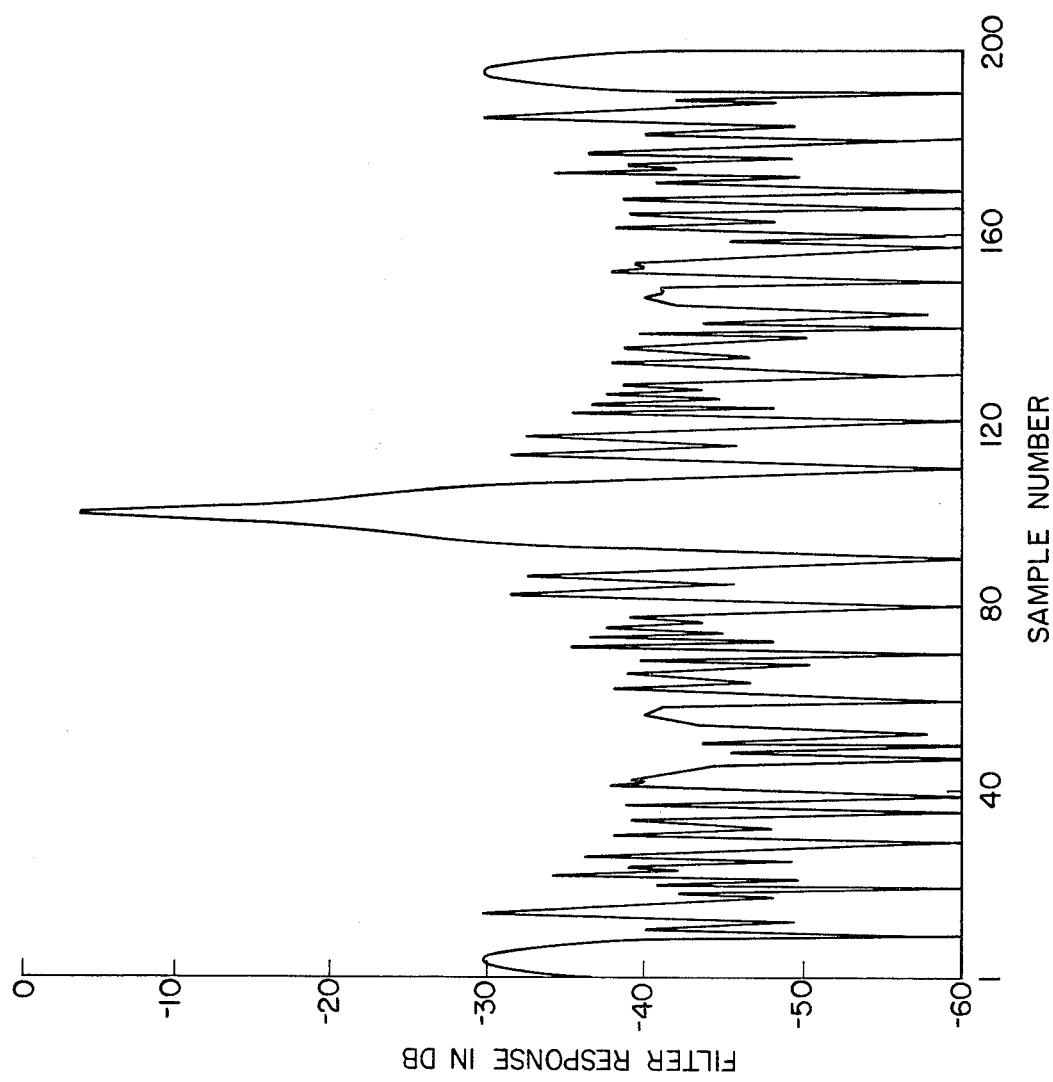
FIG. 3 is a graph of the filter response in dB for one half sample error.

FIG. 3 shows the filter response in dB for a standard pulse compression system sampling at the Nyquist rate where there is a one-half sample error. It should be noted that the mainlobe in the figure has spread out over a number of periods or range cells and is at least 3 dB down (half-power) from the mainlobe of FIG. 2. This 3 dB drop in mainlobe power results because the same energy is being spread over two or more range cells or sampling periods.

Figure 4:
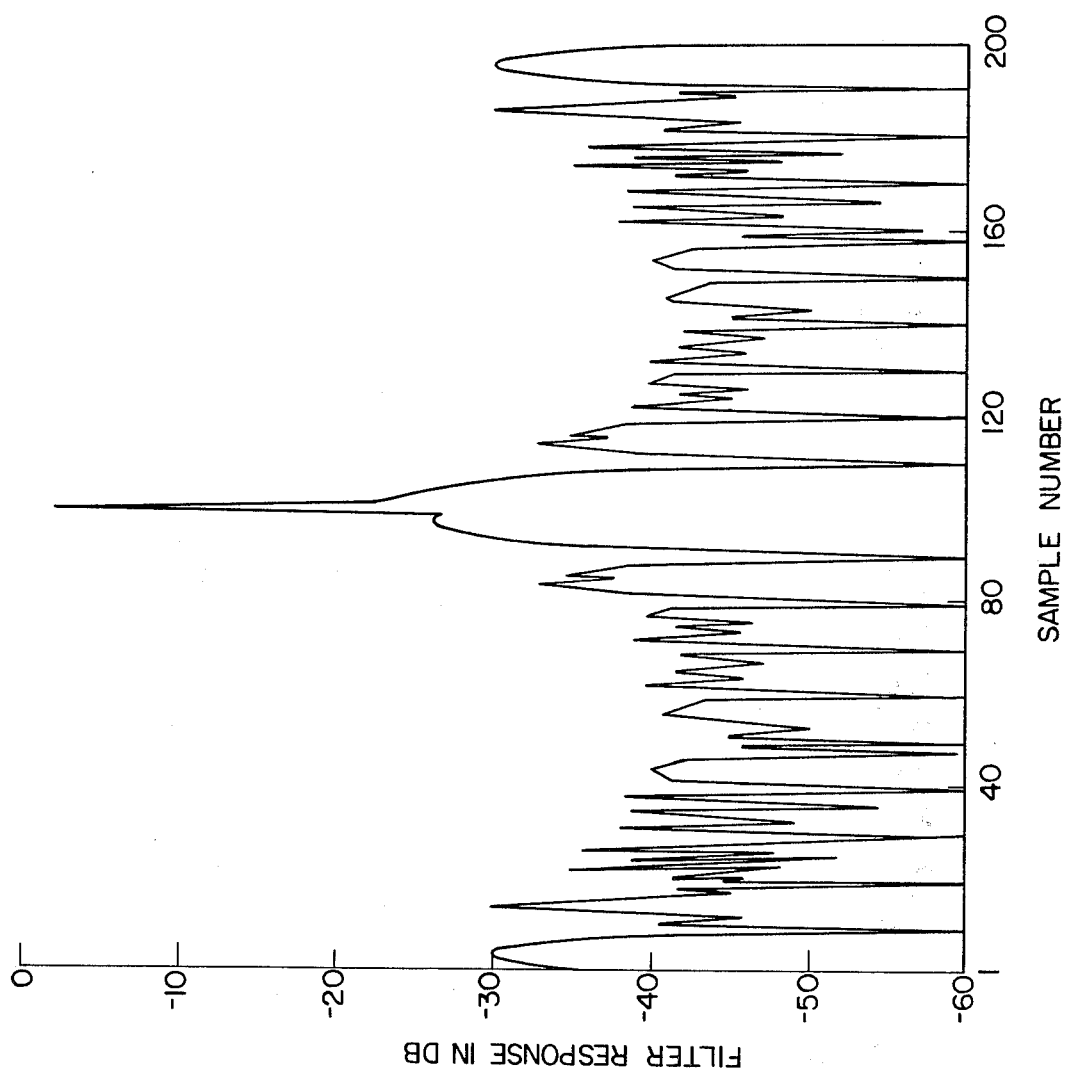
FIG. 4 is a graph of the filter response in dB for the product of one half and zero sampling errors.

FIG. 4 shows the filter response in dB for the two channel pulse compressor system disclosed in FIG. 1 with a half sample period error. In essence FIG. 4 is the result of the multiplication of a sampling channel having a one-half sample error and yielding an autocorrelation function approximately like that of FIG. 3, with a sampling channel having no sampling error and thus having an autocorrelation function approximately like that shown in FIG. 2. With such a multiplication of a very narrow pulse with a very wide pulse, the narrow pulse will tend to dominate. Accordingly, the multiplication of the narrow mainlobe of FIG. 2 with the wide mainlobe of FIG. 3 yields the narrow mainlobe of FIG. 4. Thus, this multiplication of envelopes generated via interlaced sampling prevents the mainlobe of the autocorrelation function from spreading out across a number of range cells and masking smaller targets. If the samples in one channel are in error by one-half sample, then the samples in the other channel have an approximately zero error such that a multiplication of the envelopes from these two channels will yield a narrow mainlobe with low sidelobes.

Figure 5:
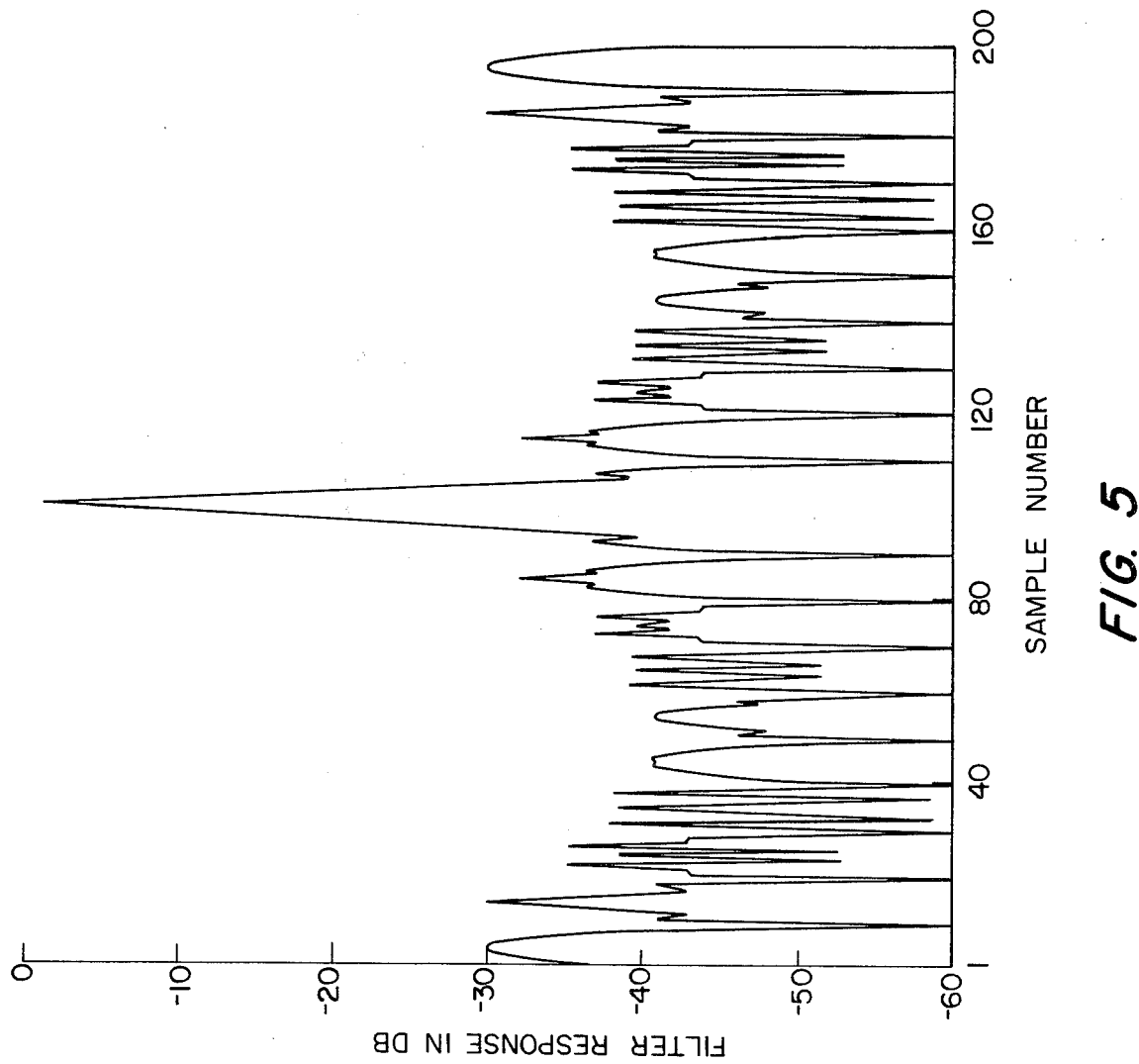
FIG. 5 is a graph of the filter response in dB for the product of one quarter sampling lead and lag errors.

The maximum sampling error that is possible with the two channel system disclosed in FIG. 1 is a one-quarter sample error in both channels. The multiplication of the one-quarter error autocorrelation function from one channel with that of the other channel yields the filter response in dB shown in FIG. 5. This multiplication reduces the broadening of the mainlobe even in this worse-case sampling error situation.

It should be noted that each of the elements in channel 16 should be synchronized with the sampling rate clock utilized for the sample and hold circuit 20. Accordingly, the clock signal 1 is applied via line 23 to each of the elements in channel 16 and also to the multiplier 50 to synchronize each of the sequential operations that are performed in that channel. Likewise, the operations of each of the elements in channel 18 should be synchronized with the sampling rate clock utilized for the sampling and hold circuit 22. Accordingly, the clock signal 2 is applied via line 24 to synchronize the sequential operations of each of the elements in channel 18.

The worse case sampling error for the system can be progressively reduced by adding additional parallel compression channels. With the two channel system disclosed in FIG. 1, the worse case one-half sampling error of the original one channel system with an approximate 4 dB decrease in sensitivity is reduced to a one-quarter sampling error with an approximate 0.9 dB loss in sensitivity. If a third compression channel is added, than the worse case sampling error will be reduced to one-sixth of a sample period yielding an approximate sensitivity loss of 0.5 dB. For even greater sensitivity loss reductions, additional compression channels can be added to the system.

In the general case, where there are n signal processing channels, where n is an integer greater than or equal to 2, then the first channel will be sampled in accordance with pulses from clock 1 as previously described. The ith processing channel, where $2 \leq i \leq n$, will be sampled in accordance with an ith clock signal having the same sampling frequency as clock 1 but with its ith clock pulses interlaced in time with the pulses of clock 1 such that the ith clock signal pulses are (i) (360°)/(n) out of phase with the pulses of clock 1. In essence, the pulses from n different clock signals are interlaced, in time, such that a very small sampling error is obtained. It is of course understood that these additional compression channels will include the same sampling and holding circuitry, compression circuitry, and envelope generation circuitry as has been disclosed for channels 16 and 18. The I and Q baseband signals will be fed to the additional sample and hold circuits via the dashed lines 13 and 15. The envelopes generated from each of these n channels will be applied to the multiplying circuit 50 via the dashed lines 52 to yield a very narrow mainlobe pulse with low sidelobes.

It can be seen that the above disclosed apparatus and method for compression processing will allow the use of the optimum Nyquist sampling rate with low range time sidelobes while significantly reducing the sampling error in the processing operation. Such sampling error reduction reduces the spreading of the mainlobe thereby preventing target masking by large cross-section targets. In essence, the present system operates to narrow the mainlobe such that it will fit in a single range cell without adversely affecting the mainlobe to sidelobe ratio.

Obviously many modifications and variations of the present invention are possible in light of the above teachings. It is therefore to be understood that within the scope of the appended claims the invention may be practiced otherwise than as specifically described.

We claim:

1. A low-sidelobe pulse compression processor for reducing the processing loss in echo signals caused by sampling time error and for improving range resolution comprising:

means for receiving an echo return signal from an energy transmission and generating I and Q baseband signals from said echo signal;

a first signal processing channel comprising
first sampling means for sampling said I and Q signals in accordance with pulses from a first clock signal having a predetermined sampling frequency;
first means for compressing said sampled I and Q signals from said first sampling means;
first means for generating the signal envelope for said compressed I and Q signals from said first compressing means;

a second signal processing channel comprising
second sampling means for sampling said I and Q signals with pulses from a second clock signal having said predetermined sampling frequency but with the second clock signal pulses interlaced, in time, approximated midway between the pulses of said first clock signal second means for compressing said sampled I and Q signals from said second sampling means;

second means for generating the signal envelope for said compressed I and Q signals from said second compressing means; and multiplying means for multiplying the output envelope signals from said first and second envelope generating means to obtain a low-sidelobe narrow output signal.

2. A low-sidelobe pulse compression processor as defined in claim 1, wherein said first and second envelope generating means each comprise a circuit for generating the magnitude of the respective sampled I and Q signals applied thereto.

3. A low-sidelobe pulse compression processor as defined in claim 1, wherein said first and second envelope generating means each comprise:

means for squaring said compressed I and Q signals;

means for adding the squared I and Q signals from said squaring means; and means for generating a signal representative of the square root of the output signal from said adding means.

4. A low-sidelobe pulse compression processor as defined in claim 3, wherein said first and second compressing means each comprise:

an analog-to-digital converter for converting said sampled I and Q signals into digital form; and a digital compression circuit for digitally compressing said digitized I and Q signals.

5. A low-sidelobe pulse compression processor as defined in claim 3, wherein said first and second sampling means include means for generating said first and second clock signals at the Nyquist sampling frequency for the I and Q baseband signals.

6. A low-sidelobe pulse compression method for reducing the processing loss in echo signals caused by sampling time errors in pulse compression processing circuitry comprising the steps of:

receiving an echo signal from an energy transmission;

generating I and Q baseband signals from said echo signal;

sampling said I and Q signals in accordance with pulses from a first clock signal having a predetermined sampling frequency and also sampling said I and Q signals in accordance with pulses from a second clock signal having said predetermined sampling frequency but with said second clock signal pulses interlaced, in time, approximately midway between the pulses of said first clock signal;

compressing said first-clock-sampled I and Q signals and also compressing said second-clock-sampled I and Q signals;

generating a first signal envelope from said compressed first-clock-sampled I and Q signals and a second signal envelope from said compressed second-clock-sampled I and Q signals; and multiplying said generated first and second signal envelopes together to obtain a low-sidelobe narrow output signal.

7. A low-sidelobe pulse compression method as defined in claim 6, wherein said signal envelope generating step comprises the step of generating the magnitude of said compressed I and Q signals sampled in accordance with said first clock signal and the magnitude of said compressed I and Q signals sampled in accordance with said second clock signal.

8. A low-sidelobe pulse compression method as defined in claim 6, wherein said signal envelope generating step comprises the steps of:

squaring said compressed first-clock-sampled I signals and Q signals and squaring said compressed second-clock-sampled I and Q signals;

adding said squared first-clock-sampled I and Q compressed signals together and adding said squared second-clock-sampled I and Q compressed signals together; and generating a signal representative of the square root of the sum of said squared first-clock-sampled I and Q signals and the square root of the sum of said squared second-clock-sampled I and Q signals.

9. A low-sidelobe pulse compression processor as defined in claim 6, wherein said sampling step comprises the step of sampling said I and Q signals in accordance with pulses from a first clock signal at the Nyquist sampling frequency and also sampling said I and Q signals in accordance with pulses from a second clock signal at the Nyquist sampling frequency, but with said second clock signal interlaced, in time, approximately midway between the pulses of said first clock signal.

10. A low-sidelobe pulse compression processor for reducing the processing loss in echo signals caused by sampling time errors and for improving range resolution comprising:

means for receiving an echo signal from an energy transmission and generating I and Q baseband signals from said echo signal;

n signal processing channels, where n is an integer >2, wherein said first signal processing channel comprises:

first sampling means for sampling said I and Q signals in accordance with pulses from a first clock signal having a predetermined sampling frequency;

first means for compressing said I and Q signals from first sampling means;

first means for generating the signal envelope for said compressed I and Q signals from said first compressing means;

and wherein said i th signal processing channel, where $1 \leq i \leq n$, comprises:

i th sampling means for sampling said I and Q signals in accordance with pulses from an i th clock signal having said predetermined sampling frequency but with said i th clock pulses interlaced, in time, with said first clock signal pulses such that said i th clock signal pulses are (i) (360°)/(n) out of phase with said first clock pulses;

i th means for compressing said i th clock sampled I and Q signals from said i th sampling means;

i th means for generating the signal envelope for said compressed I and Q signals from said i th compressing means; and multiplying means for multiplying together the output envelope signals generated in each of said n signal processing channels to obtain a low-sidelobe narrow output signal.

11. A low-sidelobe pulse compression processor as defined in claim 10, wherein said n envelope generating means each comprise a circuit for generating the magnitude of the respective sampled I and Q signals applied thereto.

12. A low-sidelobe pulse compression processor as defined in claim 10, wherein said n envelope generating means each comprise:

means for squaring said compressed I and Q signals;

means for adding the squared I and Q signals from said squaring means; and means for generating a signal representative of the square root of the signal output of said adding means.

13. A low-sidelobe pulse compression processor as defined in claim 10, wherein each of said sampling means in said n signal processing channels comprises means for generating a clock signal at a predetermined sampling frequency equal to the system information bandwidth.

* * * * *